Figure 1:
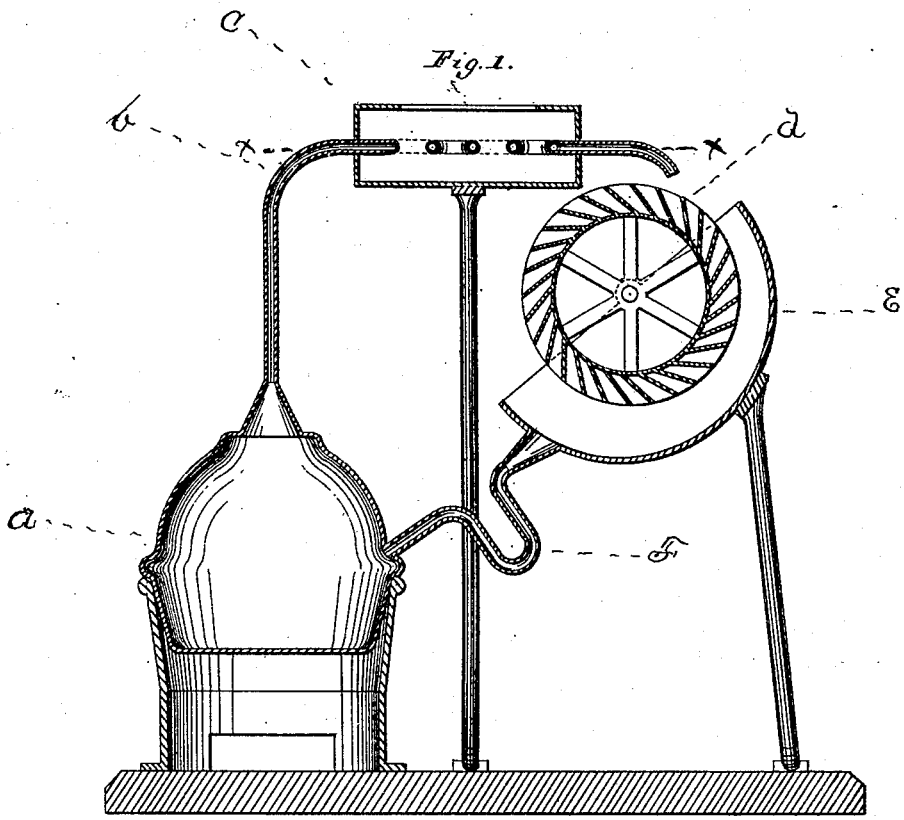

T. D. MILLER.
Process for Utilizing Mercury as a Motive Power.

No. 196,759. Patented Nov. 6, 1877.

WITNESSES:
A. Van Camp
Chas. T. Tyler

INVENTOR:
Thomas Davidson Miller
by his attorney
Thornton A. Shinn

UNITED STATES PATENT OFFICE.

THOMAS DAVIDSON MILLER, OF PITTSBURG, PENNSYLVANIA, ASSIGNOR OF ONE-HALF HIS RIGHT TO THORNTON A. SHINN, OF SAME PLACE.

IMPROVEMENT IN PROCESSES FOR UTILIZING MERCURY AS A MOTIVE POWER.

Specification forming part of Letters Patent No. 196,759, dated November 6, 1877; application filed October 24, 1877.

*To all whom it may concern:*

Be it known that I, THOMAS DAVIDSON MILLER, of the city of Pittsburg, in the county of Allegheny and State of Pennsylvania, have discovered a new and useful Process for Utilizing Mercury as a Motive Power by Sublimation and Recondensation, which process is fully set forth in the following specification.

In carrying out my process or discovery I provide any kind of retort, constructed of any material, and of any size or shape ordinarily, or that may be used for sublimating or fusing the mercury, with an attachment, at the top of the retort, of an elongated pipe bent in a zigzag direction, or its equivalent, leading from said retort through a trough containing water or other cooling material. At the end of said elongated pipe a wheel or its equivalent is to be suspended. Around the periphery of this wheel are constructed a series of buckets to catch the mercury that falls from said pipe, having been precipitated in its passage through the pipe. Said wheel is entirely inclosed, or nearly so, in a sheathing, for the purpose of catching and conducting the mercury back through a pipe into the base of the retort again. In this pipe a trap or bend is constructed to prevent the fumes coming out at that point of supply, as described in detail in the drawing hereto attached, and made part of the specification, in which—

Figure 2:
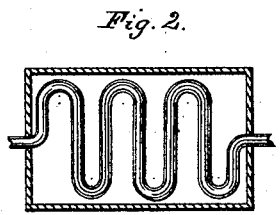

Figure 1 is an elevation, showing the machine in detail; and Fig. 2, a horizontal section taken on line $x\,x$, Fig. 1.

$a$ represents the sublimating-retort; $b$, the precipitating-pipe; C, the condensing trough or box; $d$, overshot wheel; E, protecting or inclosing sheathing, and F return-pipe with trap.

I am aware that a multiplicity of mechanical devices may be employed, and only give the above-described mechanical device of the sublimating-retort, precipitating-pipe, overshot wheel, and return-sheathing as one of the modes by which it can be utilized.

I claim—

1. The method of obtaining motive power, consisting in sublimating mercury, conducting the vapors to the desired height, precipitating them, then utilizing the weight of the mercury upon the motor, and finally returning it to the sublimating-retort to be reused, substantially as described, and for the purpose set forth.

2. In combination, the retort $a$, the precipitating-pipe $b$, the condensing trough or box C, the overshot wheel $d$, the sheathing E, and the return-pipe with trap F, substantially as described, and for the purpose set forth.

THOMAS DAVIDSON MILLER.

Witnesses:
JOHN FULLWOOD,
S. T. MILLER.